United States Patent
Wimmer

(10) Patent No.: US 9,021,067 B2
(45) Date of Patent: Apr. 28, 2015

(54) DETERMINING VLAN-IDS FOR A SWITCHED-BASED COMMUNICATION NETWORK OF A PROCESS CONTROL SYSTEM

(71) Applicant: ABB Technology AG, Zürich (CH)

(72) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 247 days.

(21) Appl. No.: 13/665,175

(22) Filed: Oct. 31, 2012

(65) Prior Publication Data

US 2013/0117421 A1  May 9, 2013

Related U.S. Application Data

(63) Continuation of application No. PCT/EP2011/056381, filed on Apr. 20, 2011.

(30) Foreign Application Priority Data

Apr. 30, 2010 (EP) .................... 10161578

(51) Int. Cl.
G06F 15/177 (2006.01)
H04L 12/46 (2006.01)

(52) U.S. Cl.
CPC .......... *G06F 15/177* (2013.01); *H04L 12/4645* (2013.01)

(58) Field of Classification Search
CPC . H04L 12/4641; H04L 41/08; H04L 41/0843; H04L 41/0879; H04L 41/0886; H04L 69/22; H04L 12/4645
USPC ................. 709/220, 223–229; 370/241, 252, 370/395.53
See application file for complete search history.

(56) References Cited

U.S. PATENT DOCUMENTS

| 8,086,713 B2 * | 12/2011 | Gandhewar et al. .......... 709/223 |
| 8,804,547 B2 * | 8/2014 | Wimmer ........................ 370/252 |
| 2010/0039954 A1 * | 2/2010 | Wimmer ........................ 370/252 |
| 2010/0040068 A1 * | 2/2010 | Wimmer .................. 370/395.53 |

FOREIGN PATENT DOCUMENTS

| EP | 2 157 731 A1 | 2/2010 |
| EP | 2 157 732 A1 | 2/2010 |

OTHER PUBLICATIONS

International Search Report (PCT/ISA/210) issued on Aug. 26, 2011, by the European Patent Office as the International Searching Authority for International Application No. PCT/EP2011/056381.
European Search Report for EP 10161578 dated Sep. 30, 2010.
E. Udren et al., "IEEE (ANSI) Device No. 16—Ethernet Switches and Routers", 2008 61$^{st}$ Annual Conference for Protective Relay Engineers, Apr. 1, 2008, pp. 247-272.
Gwan-Su Kim et al., "A Study on EIC 61850 based Communication for Intelligent Electronics Devices", KORUS 2005, Jun. 26, 2005, pp. 765-770.

* cited by examiner

*Primary Examiner* — Ruolei Zong
(74) *Attorney, Agent, or Firm* — Buchanan Ingersoll & Rooney PC

(57) ABSTRACT

A Process Control (PC) or Substation Automation (SA) system is disclosed with appropriate message filtering based on Virtual Local Area Network identifiers VLAN-IDs as communication sub-network identifiers. The VLAN-IDs are determined in order to optimize data flow in the sense that receiver IEDs only receive the intended messages, while at the same time the number of sub-network identifiers can be reduced to a maximum extent. Restricting the real time traffic in such a way can ensure proper operation of the systems, such as large SA systems using GOOSE for interlocking and having sensors connected with the Sampled Value (SV) protocol according to IEC 61850-9-2.

12 Claims, 2 Drawing Sheets

```
<Communication>
  <ConnectedAP iedName="P2KA1" apName="S1">
    <Address>
      <P type="IP">10.41.24.75</P>
      <P type="IP-SUBNET">255.255.255.0</P>
      <P type="IP-GATEWAY">10.41.24.1</P>
      <P type="OSI-AP-Title">1,3,9999,23</P>
      <P type="OSI-PSEL">00000001</P>
      <P type="OSI-SSEL">0001</P>
      <P type="OSI-TSEL">0001</P>
      <P type="SA">2</P>
    </Address>
    <GSE ldInst="C1" cbName="Interlock">
      <Address>
        <P type="MAC-Address">01-0C-CD-01-00-01</P>
        <P type="APPID">3001</P>
        <P type="VLAN-PRIORITY">4</P>
        <P type="VLAN-ID">101</P>
      </Address>
      <MinTime unit="s">4</MinTime>
      <MaxTime unit="s">1000</MaxTime>
    </GSE>
    <GSE ldInst="C1" cbName="ProtTrip">
      <Address>
        <P type="MAC-Address">01-0C-CD-01-00-02</P>
        <P type="APPID">3002</P>
        <P type="VLAN-PRIORITY">4</P>
        <P type="VLAN-ID">102</P>
      </Address>
      <MinTime unit="s">2</MinTime>
      <MaxTime unit="s">1000</MaxTime>
    </GSE>
  </ConnectedAP>
```

```xml
<Communication>
    <ConnectedAP iedName="P2KA1" apName="S1">
        <Address>
            <P type="IP">10.41.24.75</P>
            <P type="IP-SUBNET">255.255.255.0</P>
            <P type="IP-GATEWAY">10.41.24.1</P>
            <P type="OSI-AP-Title">1,3,9999,23</P>
            <P type="OSI-PSEL">00000001</P>
            <P type="OSI-SSEL">0001</P>
            <P type="OSI-TSEL">0001</P>
            <P type="SA">2</P>
        </Address>
        <GSE ldInst="C1" cbName="Interlock">
            <Address>
                <P type="MAC-Address">01-0C-CD-01-00-01</P>
                <P type="APPID">3001</P>
                <P type="VLAN-PRIORITY">4</P>
                <P type="VLAN-ID">101</P>
            </Address>
            <MinTime unit="s">4</MinTime>
            <MaxTime unit="s">1000</MaxTime>
        </GSE>
        <GSE ldInst="C1" cbName="ProtTrip">
            <Address>
                <P type="MAC-Address">01-0C-CD-01-00-02</P>
                <P type="APPID">3002</P>
                <P type="VLAN-PRIORITY">4</P>
                <P type="VLAN-ID">102</P>
            </Address>
            <MinTime unit="s">2</MinTime>
            <MaxTime unit="s">1000</MaxTime>
        </GSE>
    </ConnectedAP>
```

Fig. 1A

```xml
<IED name="P2KA1" type="REC670" manufacturer="ABB" >
    <AccessPoint name="S1">
        <Authentication none="true" />
        <LDevice inst="C1">
            <LN0 inst="" lnClass="LLN0" lnType="LLN0_REC316-4_IEC61850">
                ....
                <GSEControl name="Interlock" datSet="Interlock" confRev="2" appID="ITL1">
                    <IEDName>P2KA4</IEDName>
                    <IEDName>P2KA3</IEDName>
                    <IEDName>P2KA2</IEDName>
                </GSEControl>
                <GSEControl name="ProtTrip" datSet="Trips" confRev="5" appID="PROT1">
                    <IEDName>P2KA5</IEDName>
                </GSEControl>
            </LN0>
    </AccessPoint>
</IED>
```

Fig. 1B

DETERMINING VLAN-IDS FOR A SWITCHED-BASED COMMUNICATION NETWORK OF A PROCESS CONTROL SYSTEM

RELATED APPLICATION

This application claims priority as a continuation application under 35 U.S.C. §120 to PCT/EP2011/065381, which was filed as an International Application on Apr. 20, 2011 designating the U.S., and which claims priority to European Application 10161578.9 filed in Europe on Apr. 30, 2010. The entire contents of these applications are hereby incorporated by reference in their entireties.

FIELD

Process Control systems are disclosed herein, such as Substation Automation systems, with a standardized configuration representation and an Ethernet switch based communication network.

BACKGROUND INFORMATION

Process control or industrial automation systems are used to protect, control and monitor industrial processes in industrial plants; e.g., for manufacturing goods, transforming substances, or generating power, as well as to monitor and control extended primary systems like electric power, water or gas supply systems or telecommunication systems, including their respective substations. An industrial automation system can have a large number of process controllers distributed in an industrial plant or over an extended primary system, and communicatively interconnected via a communication system.

Substations in high and medium-voltage power networks include primary devices such as electrical cables, lines, bus bars, switches, power transformers and instrument transformers, which can be arranged in switch yards and/or bays. These primary devices are operated in an automated way via a Substation Automation (SA) system. The SA system comprises secondary devices, so-called Intelligent Electronic Devices (IED), responsible for protection, control and monitoring of the primary devices. The IEDs may be assigned to hierarchical levels, such as the station level, the bay level, and the process level, where the process level is separated from the bay level by a so-called process interface. The station level of the SA system includes an Operator Work Station (OWS) with a Human-Machine Interface (HMI) and a gateway to a Network Control Centre (NCC). IEDs on the bay level, which may also be referred to as bay units, in turn are connected to each other as well as to the IEDs on the station level via an inter-bay or station bus serving the purpose of exchanging commands and status information.

IEDs on the process-level can include (i) electronic sensors for voltage (VT), current (CT) and gas density measurements, (ii) contact probes for sensing switch and transformer tap changer positions, and/or (iii) intelligent actuators (I/O) for changing transformer tap positions, or for controlling switchgear like circuit breakers or disconnectors. Exemplary process-level IEDs such as non-conventional current or voltage transformers include an Analogue-to-Digital (A/D) converter for sampling of analogue signals. Process-level IEDs are connected to the bay units via a process bus, which can be considered as the process interface replacing the conventional hard-wired process interface. The latter connects a current or voltage transformer in the switchyard to the bay level equipment via dedicated copper wires, in which case the analogue signals of the instrument transformers are sampled by the bay units.

A communication standard for communication between the secondary devices of a substation has been introduced by the International Electrotechnical Committee (IEC) as part of the standard IEC 61850 entitled "communication networks and systems in substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media. For time-critical event-based messages, IEC 61850-8-1 specifies the Generic Object Oriented Substation Events (GOOSE) directly on the Ethernet link layer of the communication stack. For very fast periodically changing signals at the process level such as measured analogue voltages or currents IEC 61850-9-2 specifies the Sampled Value (SV) service, which like GOOSE builds directly on the Ethernet link layer. Hence, the standard defines a format to publish, as multicast messages on an industrial Ethernet, event-based messages and digitized measurement data from current or voltage sensors on the process level. SV and GOOSE messages are transmitted over a process bus, which may, for example, in cost-effective medium or low voltage substations, extend to neighbouring bays (e.g., beyond the bay to which the sensor is assigned). In the latter case, the process bus transmits, in addition to the process data, command and/or status related messages otherwise exchanged via a dedicated station bus. In the following, the distinction between process and station bus in SA systems is done away with.

SA systems based on IEC61850 are configured and described by way of a standardized configuration representation or formal system description called Substation Configuration Description (SCD). An SCD file includes the logical data flow between the IEDs on the basis of message types or data sets (e.g., for every message source, a list of destination or receiver IEDs, the message size in terms of data set definitions, as well as the message sending rates for all periodic traffic like GOOSE, SV and Integrity reports). The SCD file likewise includes the relation between the IEDs as well as the functionality which the IEDs execute on behalf of the substation process or switch yard. In addition to SA systems for substations in high and medium-voltage power networks, other process control systems (e.g., for hydro power plants, wind power systems, and Distributed Energy Resources (DER)), may likewise be described by a formal system description at least partly identical to IEC61850.

In communication systems technology, within Local Area Networks (LAN) constructed by connecting a plurality of computers or other intelligent devices together, a concept called "virtual LAN" (VLAN) employs functionality for arbitrarily and logically grouping terminals or nodes which are connected to switches of the network. Ethernet VLANs according to IEEE 802.1Q allow restricting access to the terminals connected to an Ethernet network within a VLAN as well as restricting the data flow of multicast Ethernet messages to predefined parts of the Ethernet network where receiver terminals are connected which belong to the same VLAN.

In state of the art Ethernet switch-based networks as used for office and commercial applications, VLAN definitions are handled within the Ethernet switches, therefore the latter have to be configured or otherwise made aware of the relevant VLANs. Specifically, for each port of a switch, the switch has to know if a particular incoming VLAN (multicast) message shall be forwarded to this port or not (e.g., if this port also belongs as output port to the VLAN of the incoming message). Furthermore, in state of the art Ethernet switch-based networks it is assumed that any single connected terminal or end node belongs to one specific VLAN only. This terminal can then only talk to other terminals belonging to the same VLAN. When configuring the switches, the ports to these communicating terminals are therefore called access ports, and these access ports are only allowed to belong to one VLAN, while the other ports internal to the communication system, called trunk ports, belong to several VLANs. It is, for example, also assumed that all IEDs are spontaneously sending data within their VLAN.

Contrary thereto, in a process control real time application an IED can send different real time messages for different purposes within different VLANs. Therefore, here the concept of access ports cannot be applied; however the concept of an edge port (e.g., a port which has not to be considered by the RSTP loop avoidance algorithm in physically meshed networks), is still valid for the IEDs (in this notation, an edge port connected to an IED that is assigned to one single VLAN corresponds to an access port). This can complicate the configuration of VLANs on the switches. Further on, sometimes the receivers of messages of a VLAN do not send messages within the same VLAN they receive (e.g., they do not send any VLAN messages, or send within another VLAN), which prohibits automatic VLAN detection by the switches.

Another mechanism to restrict the flow of multicast messages within a switched Ethernet network employs different multicast addresses for different message sources, and relies on the Ethernet switches supporting message filtering based on multicast addresses. Here a management protocol exists which allows the switches to automatically manage any multicast data flow in an optimal way, if the receivers subscribe to the needed multicast addresses at their connection or edge port to the switch network. This approach does not involve manual configuration of switches; however its effectiveness to restrict the message flow depends on the assignment of multicast addresses to the message sources which is done manually during engineering/configuration in the case of GOOSE and SV messages.

For large process control systems with increased real time critical communication needs due to multicast communication traversing the entire system and including vertical communication to station level, the communication network load can be important within the control system as well as at the receiving application IEDs. This is the case for example, with GOOSE and SV messages according to IEC 61850, which are based on Ethernet multicast messages, and station level IEDs such as Operator Work Station and gateway which are not adapted to handle more than 200 to 1000 messages per second.

In this context, a straightforward method to obtain an optimal data flow in the sense that only the needed messages are routed to a receiver assigns to each message source its own (multicast or VLAN or both) identification. However, for a process control system with around 300 IEDs each having at least two different GOOSE message sources this amounts to at least 600 different message sources and identifications, while the recommended identification range for GOOSE multicast addresses only allows 512 different identifications. Additionally, the more addresses the switches have to consider for the filtering, the more memory and CPU resources they need, and the more work is involved to configure them and keep them consistent.

The patent application EP 2157732 discloses a way to automatically generate VLAN configuration data for a switch in the communication network of a Process Control (PC) or Substation Automation (SA) system. For each sender IED and for each message configured to be transmitted by the sender IED, the receiver IEDs to which the message is destined as well as a Virtual Local Area Network Identifier VLAN ID are retrieved from a standardized configuration representation of the system. For each receiver IED, the VLAN IDs of all the messages destined to this receiver IED are then assigned to an edge port of a switch to which this receiver IED is connected.

SUMMARY

A method is disclosed of determining Virtual Local Area Network identifiers (VLAN-IDs) in an Ethernet switch-based communication network of a process control (PC) system having a plurality of Intelligent Electronic Devices (IEDs), connected to switches of the Ethernet switch-based communication network, wherein IEDs are configured to periodically send multicast messages, and wherein the switches are adapted to selectively forward a multicast message based on message-specific VLAN-IDs, the method comprising: retrieving, for each sender IED of the plurality of IEDs and for each message configured to be transmitted by each sender IED, from a system description of the PC system having logical data flow definitions, receiver IEDs for which the message is destined; identifying a first exhaustive set of receiver IEDs of a first message, and a second exhaustive set of receiver IEDs of a second message; assigning, when the first and second sets of receiver IEDs differ in at most the sender IEDs, a same VLAN-ID to both the first and second messages, and storing the assigned VLAN-ID in a system description of the PC system.

An Ethernet switch-based communication network of a Process Control (PC) system, is disclosed comprising: a plurality of Intelligent Electronic Devices (IEDs) connected to switches of the Ethernet switch-based communication network, wherein the IEDs are configured to periodically send multicast messages, and wherein the switches are adapted to selectively forward a multicast message based on message-specific Virtual Local Area Network identifiers (VLAN-IDs) determined; and a processor configured for: retrieving, for each sender IED of the plurality of IEDs and for each message configured to be transmitted by each sender IED, from a system description of the PC system having logical data flow definitions, receiver IEDs for which the message is destined; identifying a first exhaustive set of receiver IEDs of a first message, and a second exhaustive set of receiver IEDs of a second message; assigning, when the first and second sets of receiver IEDs differ in at most the sender IEDs, a same VLAN-ID to both the first and second messages, and storing the assigned VLAN-ID in a system description of the PC system.

A configuration tool is disclosed for configuring an Ethernet switch-based communication network of a Process Control (PC) system, comprising: a plurality of Intelligent Electronic Devices (IEDs) connected to switches of the Ethernet switch-based communication network, wherein the IEDs are configured to periodically send multicast messages, and wherein the switches are adapted to selectively forward a multicast message based on message-specific Virtual Local Area Network identifiers (VLAN-IDs); and a processor configured to: retrieve, for each sender IED of the plurality of IEDs and for each message configured to be transmitted by said sender IED, from a system description of the PC system, the receiver IEDs for which the message is destined, as well as the assigned VLAN ID; and to assign, for each receiver IED, VLAN IDs of all the messages destined for this receiver IED to an edge port of a switch of the communication network to which this receiver IED is connected.

BRIEF DESCRIPTION OF THE DRAWINGS

The subject matter disclosed herein will be explained in more detail in the following text with reference to exemplary embodiments which are illustrated in the attached drawings, of which:

FIGS. 1A and 1B show an excerpt of an SCD description of an exemplary IED with two GOOSE control blocks;

DETAILED DESCRIPTION

Figure 2:
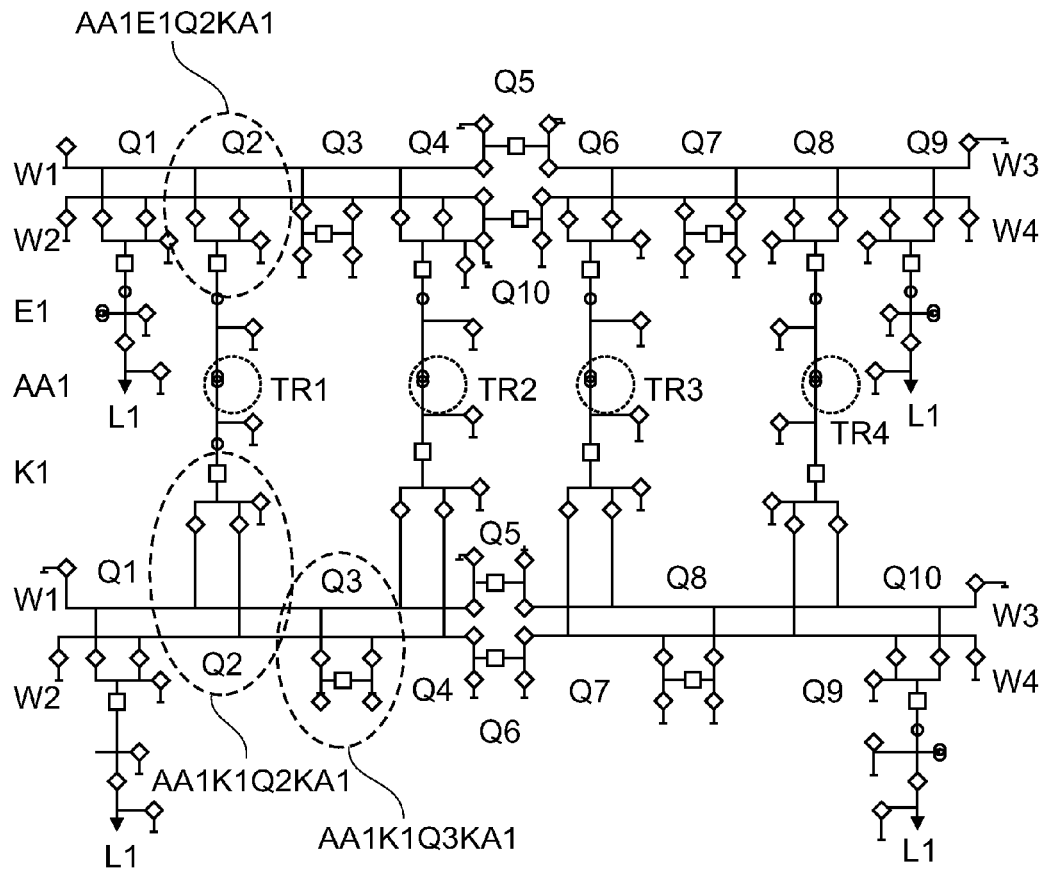
FIG. 2 depicts an exemplary substation with two voltage levels, as well as the IEDs of the respective Substation Automation system.

Exemplary embodiments as disclosed herein can minimize, in a switched communication network of a Process Control (PC) or Substation Automation (SA) system, the number of data flow networks represented by Virtual Local Area Network identifiers (VLAN-IDs) for selective forwarding of network messages by the switches of the switched communication network. An exemplary method is also disclosed determining VLAN-IDs in an Ethernet switch-based communication network of a PC system, an Ethernet switch-based communication network of a PC system, and a configuration tool for configuring an Ethernet switch-based communication network of a PC system.

According to an exemplary method of determining VLAN-IDs in an Ethernet switch-based communication network of a PC system, such as of an SA system, having a plurality of Intelligent Electronic Devices (IEDs) connected to switches of the Ethernet switch-based communication network, which periodically or continually multicast messages are sent which in turn are selectively forwarded by the switches, the method comprises:

retrieving, for each sender IED of the plurality of IEDs and for each message configured to be transmitted by said sender IED, from a formal system description or standardized configuration representation of the PC system comprising the logical data flow definitions, the receiver or destination IEDs to which the message is destined;

identifying, as subsets of the plurality of IEDs, a first exhaustive set of receiver IEDs of a first message (e.g., all the IEDs that receive the first message from a first sender IED), and a second exhaustive set of receiver IEDs which all receive a second message from a second sender IED;

assigning, if the first and second set of receiver IEDs differ in at most the two sender IEDs, the same VLAN-ID to both the first and second message, or the respective message source control blocks—in other words, for example, attributing the same VLAN-ID if all destination IEDs except the two source IEDs themselves are identical (e.g., the sources as mutual destinations are excluded from the comparison), while assigning different VLAN-IDs to all third messages for which the set of receiver IEDs does not match the first and second set of receiver IEDs; and writing and storing the assigned VLAN-IDs as part of the formal system description for subsequent automated configuration tasks.

The VLAN IDs as determined can be used for standard VLAN configuration as well as for multicast address filtering in a switched Ethernet network as a part of a multicast address, and to that purpose can be configured into and stored in the message source control blocks of the respective multicast messages. Each message instance sent according to the configured message source control block embeds the message-specific VLAN-ID and/or multicast address, which are evaluated by the switches for selective forwarding. In an exemplary standard VLAN configuration, the determined VLAN-IDs are assigned to switches of the communication network during engineering, and loaded into the switches during commissioning, and thus configure the switches and their edge ports to the IEDs (e.g., as detailed in EP 2157732). In a multicast address filter configuration, the calculated VLAN-IDs are used as specific multicast address identifiers by adding them at the end of the standardized IEC 61850 multicast address prefix for GOOSE and SV messages.

If the switches of the communication network are able to handle at the same time both standard VLAN configuration and multicast filtering, the two aforementioned mechanisms may even be used concurrently. For example, a standard VLAN may be defined manually, based on considerations beyond the scope of the present disclosure, and multicast filtering may be performed within such VLAN, based on identifiers as determined according to the present disclosure. Thus, even if VLANs are used statically to secure network access, the automatically calculated multicast identifier can be exploited via dynamically built or statically configured multicast address filtering to optimize the load on the receiving IEDs.

In an exemplary embodiment, communication or data flow clusters are identified for a particular distributed Process Control application such as interlocking, reverse blocking, or breaker failure protection in Substation Automation. For each sender IED of the plurality of IEDs and for each message configured to be transmitted by said sender IED, a message source control block configures and generates the message. Message source control blocks qualify as cluster members if the messages configured by them and belonging to the particular application are not addressed to non-cluster members, and are exclusively sent to some or all of the other cluster members. The qualified cluster members, and/or the respective messages being confined to within the cluster, are assigned the same VLAN-ID.

In a further exemplary embodiment, a communication cluster is defined via cluster connections identified, for the particular distributed application, between a message source control block and receiver IEDs. If a first message of a sender IED is sent, according to the respective first message source control block, to a second or receiver IED and additionally to at least one third IED, to which in turn the second IED is also sending a message pertaining to the particular distributed application, the connection between the first message source control block and the second IED is considered a cluster connection. Two message source control blocks which have cluster connections only, and which in addition include the sender IED of the other message among the respective destination IEDs, are assigned to the same communication cluster. In other words, a communication cluster is identified as a number of message source control blocks on IEDs mutually interconnected by cluster connections, wherein a message to a receiver IED is also received by a third IED, with the latter likewise receiving another message from the receiver IED.

Ultimately, cluster members, and/or the respective messages being confined to within the cluster, are assigned the same cluster VLAN-ID. On the other hand, a message source control block with at least one non-cluster connection is assigned a VLAN-ID different from the cluster VLAN-ID, wherein such "weak" or "non-cluster" message sources may further be subjected to a VLAN-ID determination algorithm as detailed above.

Thus, in an exemplary PC or SA system with appropriate message filtering based on VLAN-IDs as communication sub-network identifiers established according to the present disclosure, data flow is optimized in the sense that receiver IEDs only receive the intended messages, while the number of sub-network identifiers is reduced to a maximum extent. Restricting the real time traffic in such a way will ensure proper operation of the systems, and particular of large SA systems using GOOSE for interlocking and having sensors connected with the Sampled Value (SV) protocol according to IEC 61850-9-2. At the same time, a configuration tool with above described functionality will allow set up for this kind of system for people with little knowledge about switches, further reduce the engineering time for more complex systems, and reduce engineering errors. The latter in turn will reduce the need to investigate problems that arise from temporary communication system overload. A computer program product including computer program code for controlling one or more processors of the configuration tool can also be provided.

As an example of formal system descriptions referred to in this specification, IEC61850 conformant descriptions of Sub-station Automation systems can comprise a communication section with real-time related control blocks (GOOSE and SAV) identifying all senders of VLAN related messages. The SCD file describes additionally the logical data flow, defining intended destination IEDs at message control blocks located within the IED section of the SCD description.

FIGS. 1A and 1B show an excerpt of a formal Substation Configuration Description SCD in Substation Configuration Language SCL, directed to an IED "P2KA1" with two GOOSE control blocks sending to a total of four receiver IEDs. FIG. 1A) is an excerpt of the communication section, with AccessPoint "S1" of IED "P2KA1" listing, next to its IP address, two GOOSE Control Blocks (CB) identified as "interlock" and "ProtTrip". As a result of the procedure detailed below, these two CBs have been assigned distinct VLANs (VLAN-ID 101, 102) and, at the same time, distinct Multicast Addresses (01-0C-CD-01-01-01, 01-0C-CD-01-01-02). In this case, the Ethernet Switches may rely on either the VLAN definition or the multicast filtering, or both. Details about the GOOSE messages and the intended receivers (P2KA2 to P2KA5) are specified in the message Control Blocks of the IED section, and are partly shown in FIG. 1B).

From the logical data flow comprising senders of VLAN related messages and intended destination IEDs as, for example, described in the SCD file, the number of optimal (in the sense of excluding reception of a message by IEDs which do not need the message) VLAN-IDs for the message sources is minimized by taking into account some exemplary rules or guiding principles:
  Rule 1: All receiver IEDs of a message are assigned the same VLAN-ID.
  Rule 2: All messages sent to exactly the same set of receiver IEDs, notwithstanding or excluding the respective sender IEDs of the messages, are assigned the same VLAN-ID. If the set of receiver IEDs for two messages differ in extent of the respective senders, the messages should have different VLAN IDs.

Figure 3:
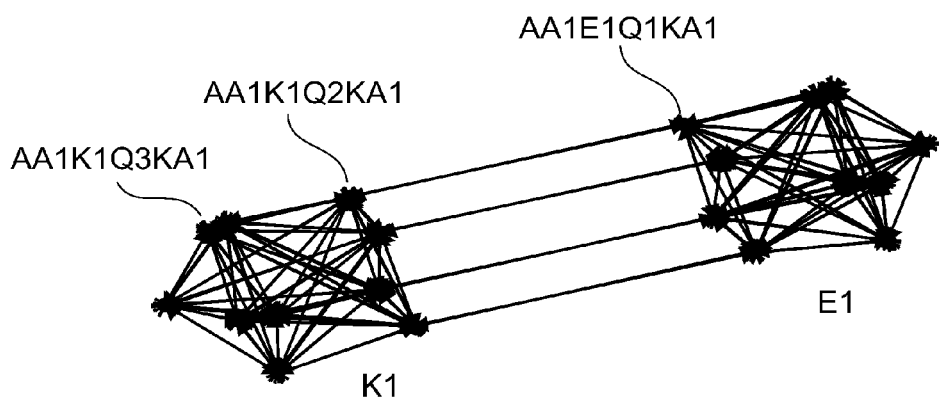
FIG. 3 illustrates exemplary data flow related to the station interlocking application between bay controllers of the substation of FIG. 2.

FIG. 3 illustrates the data flow related to the station interlocking application between bay controllers of a substation with two voltage levels (E1, K1) as depicted in FIG. 2. Each voltage level comprises four bus bars (W1-W4), and the former are connected via four transformers (TR1-TR4). Exemplary bay controllers (AA1K1Q2KA1, AA1K1Q4KA1, AA1E1Q2KA1) are in charge of pieces of primary equipment as indicated by the broken lines. In FIG. 3, each line represents a specific message defined by a control block as shown in FIG. 1. In this particular case all controllers of one voltage level send their switch state information to all other controllers of the same voltage level, while only for the four transformers connecting the voltage levels interlocking related information is sent from the transformer bay controller (AA1K1Q2KA1) in one voltage level to the corresponding transformer bay controller (AA1E1Q2KA1) in the other voltage level.

FIG. 3 clearly exhibits a data flow or communication cluster on each of the two voltage levels, hence a distinct VLAN-ID for each of the two voltage levels may suffice to separate these clusters. Further, the connections between the voltage levels could either be assigned the same VLAN-ID, resulting in all controllers of one voltage level receiving all messages related to transformer interlocking at the other voltage level, or they could each be assigned a dedicated VLAN. In the latter case, minimum load on the receivers is assured at the expense of needing five VLAN-IDs as input on each of the six non-transformer bay controllers (e.g., four from the four transformer bay controllers as well as the common VLAN-ID for the voltage level). This number could be reduced to one received VLAN per controller, if the transformer bay information would be sent twice—once within the common VLAN, once within the special transformer related VLAN. However, sending the same information twice adds some additional load to the common communication infrastructure.

The overall choice between minimized number of VLAN-IDs at a receiver IED and minimum load due to repeated sending of the same information is taken by the project engineer by providing appropriate control blocks with appropriate receiver definitions when engineering the data flow. Subsequently, and for whatever the engineer has manually specified as a separate logical data flow and/or message receiver, an exemplary method according to the present disclosure provides for an updated VLAN allocation with a minimized number of VLAN-IDs.

In the case of several IEDs sending to each other but not to all others, an exemplary way of identifying (e.g. voltage level related as in FIG. 3) data flow clusters as well as inter-cluster connections or connections from a cluster to some single receivers is proposed in the following.

To automate the identification of clusters, a distinction between "cluster connections" and "weak connections" is made on an application level. In other words, and in order to save processing time, the basic distributed applications interlocking, reverse blocking, and breaker failure are treated separately in the following. Other, or further refined, common applications can be formally defined in a standardized configuration representation, such as, for example, according to IEC 61850, by having the same AppID value at the control block, or the same data set name for all messages.

In the following, a connection is understood to mean a unidirectional data flow configuration of a source message from a first or sender IED to a second, receiver or destination IED as defined by the respective message control block. Such a connection to the second IED is considered to be a cluster connection, if the source message is also sent to a third IED, and if another message belonging to the same application is configured to be sent from the second IED to the third IED. On the other hand, if no such third IED exists, the connection between sender and receiver IED is considered to be a weak connection (e.g. the four inter-voltage level connections in FIG. 3). Any message control block having at least one weak connection does not qualify as a cluster member and is being isolated as detailed below.

Whether or not, in the case of a confirmed cluster connection, the connection from the first IED to the third IED likewise qualifies as a cluster connection, can be determined in a separate step, and can depend on the destination IEDs of the messages sent by the third IED. The same investigation has to be made for any connection originating at the second IED. Ultimately, if the message control block of the first IED and a message control block of a second or receiver IED exclusively have cluster connections to their respective destination IEDs, and if in addition the destination IEDs of the message control block of the second IED comprises the first IED, the two message control blocks are assigned the same VLAN-ID. In other words, if the data flow between the first and the second IED is a cluster connection in both directions, the two message control blocks involved become cluster members of the same communication cluster.

Rule 3: All messages of a particular application sent by members of a single communication cluster are assigned the same "cluster" VLAN-ID, while any message having at least one weak connection (i.e. one of the destination IEDs is not "clustered" with the source control block of the message) is assigned a dedicated "weak" VLAN-ID.

The "weak" VLAN-ID is unique per message source except if Rule 2 above applies (several weak connections pointing to the same set of receivers, as is the case e.g. for the reverse blocking protection function). Contrary to Rule 2, Rule 3 allows for some messages to be received by non-intended destination IEDs in the cluster. On the other hand, Rule 3 has significantly less processing overhead than Rule 2 alone, which can be further reduced by the project engineer due to appropriate definition of applications.

If a multicast message has weak connections to some IEDs, while it has cluster connections to some other IEDs, due to the fact that one message can have only one VLAN-ID, the rule for weak connections applies. Hence a "weak" source control block does not belong to a cluster comprising other message source control blocks of the same application, which implies that those cluster IEDs requiring this message must receive, or subscribe to, two VLAN-IDs, i.e. to the cluster VLAN-ID for other messages sent within the cluster, as well as to the dedicated "weak" VLAN-ID for said multicast message.

These definitions and the algorithmic approach can reduce the number of VLANs to which a receiver needs to belong, and can assure that the receiver only gets those messages it really needs—as long as within a cluster every sender actually sends to each other cluster member, which might not always be the case. However, the outcome of the proposed approach can also be influenced by the project engineer when deciding which messages belong to an application. For instance, the engineer may introduce distinct interlocking applications InterlockHV and InterlockMV instead of one single interlocking application, which then are assigned distinct VLAN-IDs. In any case, all of the distributed applications like interlocking, reverse blocking, breaker failure protection, get an optimal VLAN allocation by applying above rules for VLAN identification generation and allocation to multicast message sources.

In the following example of a system with GOOSE based interlocking function giving rise to a logical data flow as shown in FIG. 3 the effect of this algorithm allocating VLANs is illustrated. The table below lists the resulting normal and burst load on the receiver IEDs if no VLANs are configured (e.g., the default VLAN 000 is used), such that that all multicast messages go to all IEDs.

| IED name | kBit/s | Msgs/s | Burst msgs | VLAN IDs |
|---|---|---|---|---|
| AA1K1Q4KA1 | 190 | 19 | 57 | 000 |
| AA1K1Q10KA1 | 190 | 19 | 57 | 000 |
| AA1K1Q9KA1 | 190 | 19 | 57 | 000 |
| AA1K1Q8KA1 | 190 | 19 | 57 | 000 |
| AA1K1Q7KA1 | 190 | 19 | 57 | 000 |
| AA1K1Q6KA1 | 190 | 19 | 57 | 000 |
| AA1K1Q5KA1 | 190 | 19 | 57 | 000 |
| AA1K1Q3KA1 | 190 | 19 | 57 | 000 |
| AA1K1Q1KA1 | 190 | 19 | 57 | 000 |
| AA1K1Q2KA1 | 190 | 19 | 57 | 000 |
| AA1E1Q10KA1 | 190 | 19 | 57 | 000 |
| AA1E1Q9KA1 | 190 | 19 | 57 | 000 |
| AA1E1Q8KA1 | 190 | 19 | 57 | 000 |
| AA1E1Q7KA1 | 190 | 19 | 57 | 000 |
| AA1E1Q6KA1 | 190 | 19 | 57 | 000 |
| AA1E1Q5KA1 | 190 | 19 | 57 | 000 |
| AA1E1Q4KA1 | 190 | 19 | 57 | 000 |
| AA1E1Q3KA1 | 190 | 19 | 57 | 000 |
| AA1E1Q2KA1 | 190 | 19 | 57 | 000 |
| AA1E1Q1KA1 | 190 | 19 | 57 | 000 |

By using the described algorithm one cluster is assigned the VLAN-ID 10, the other cluster is assigned the VLAN-ID 20, and each of the four transformer bays in the appropriate voltage level is assigned one of the VLANs 11, 12, 13, 14 resp. 21, 22, 23, 24. The table below lists the VLANs as allocated with above algorithm to the different message sources and the resulting received load in normal and in burst situation per receiver IED. The expected reduction by keeping voltage level specific load within the voltage level can be seen, leading to roughly half the load due to the fact that each voltage level has the same number of bays in this example. It can also be seen that exactly the eight transformer bay controllers have a slightly higher load (e.g., +1 per second in normal state) due to the appropriate message from the corresponding transformer bay in the other voltage level. In terms of average load per VLAN, the VLANs 10, 20 each have six message sources (the six non-transformer bay controllers), while all other VLANs have only one message source.

| IED name | kBit/s | Msgs/s | Burst msgs | VLAN IDs |
|---|---|---|---|---|
| AA1K1Q4KA1 | 100 | 10 | 30 | 023 014 013 012 010 |
| AA1K1Q10KA1 | 90 | 9 | 27 | 014 013 010 012 011 |
| AA1K1Q9KA1 | 100 | 10 | 30 | 021 014 013 010 011 |
| AA1K1Q8KA1 | 90 | 9 | 27 | 014 013 012 010 011 |
| AA1K1Q7KA1 | 100 | 10 | 30 | 022 014 012 010 011 |
| AA1K1Q6KA1 | 90 | 9 | 27 | 014 013 012 010 011 |
| AA1K1Q5KA1 | 90 | 9 | 27 | 014 013 012 010 011 |
| AA1K1Q3KA1 | 90 | 9 | 27 | 014 013 012 010 011 |
| AA1K1Q1KA1 | 90 | 9 | 27 | 014 013 012 010 011 |
| AA1K1Q2KA1 | 100 | 10 | 30 | 024 013 012 010 011 |
| AA1E1Q10KA1 | 90 | 9 | 27 | 024 023 022 021 020 |
| AA1E1Q9KA1 | 90 | 9 | 27 | 024 023 022 021 020 |
| AA1E1Q8KA1 | 100 | 10 | 30 | 024 023 022 020 012 |
| AA1E1Q7KA1 | 90 | 9 | 27 | 024 023 022 021 020 |
| AA1E1Q6KA1 | 100 | 10 | 30 | 024 023 021 020 013 |
| AA1E1Q5KA1 | 90 | 9 | 27 | 024 023 022 021 020 |
| AA1E1Q4KA1 | 100 | 10 | 30 | 024 022 021 020 011 |
| AA1E1Q3KA1 | 90 | 9 | 27 | 024 023 022 021 020 |
| AA1E1Q2KA1 | 100 | 10 | 30 | 023 022 021 020 014 |
| AA1E1Q1KA1 | 90 | 9 | 27 | 024 023 022 021 020 |

It can further be seen, that each IED should be configured to belong to five VLANs, its own cluster as well as the four weak connections across the transformer. This is a reduction by at least a factor of two against the simple way to have a unique identification for each of the 20 sources, leading to allocation of 9 or 10, respectively, VLANs to each receiving IED, and a reduction of the overall number of VLAN identifications to 10 instead of 20. With only 2 transformers involving only 4 weak connections instead of 8, the number of VLANs would be further reduced to 6 instead of 10.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of determining Virtual Local Area Network identifiers (VLAN-IDs) in an Ethernet switch-based communication network of a process control (PC) system having a plurality of Intelligent Electronic Devices (IEDs), connected to switches of the Ethernet switch-based communication network, wherein IEDs are configured to periodically send multicast messages, and wherein the switches are adapted to selectively forward a multicast message based on message-specific VLAN-IDs, the method comprising:
  retrieving, for each sender IED of the plurality of IEDs and for each message configured to be transmitted by each sender IED, from a system description of the PC system having logical data flow definitions, receiver IEDs for which the message is destined;
  identifying a first exhaustive set of receiver IEDs of a first message, and a second exhaustive set of receiver IEDs of a second message;
  assigning, when the first and second sets of receiver IEDs differ in at most the sender IEDs, a same VLAN-ID to both the first and second messages, and
  storing the assigned VLAN-ID in a system description of the PC system.

2. The method according to claim 1, comprising:
  employing the assigned VLAN-ID for multicast address filtering at a connection or port of a switch of the communication network to which a receiver IED of the first and second message is connected.

3. The method according to claim 1, comprising:
  identifying a communication cluster having a number of message sources for each of which a message source control block configures a message to be transmitted by a sender IED of the cluster, wherein all messages sent by the sender IEDs of the cluster and related to a particular application of the PC system are exclusively sent to some or all of the other sender IEDs of the cluster; and
  assigning the same VLAN-ID to all the message sources of the communication cluster.

4. The method according to claim 1, comprising:
  identifying a communication cluster having a number of message sources for each of which a message source control block configures a message to be transmitted by a sender IED of the cluster, wherein each message source of the cluster is connected to all sender IEDs of the cluster via a cluster connection, wherein a connection from a message source to a receiver IED is a cluster connection if a first message configured to be transmitted from the message source to the receiver IED is also destined to a third set of receiver IEDs and if a second message, related to the same application as the first message, is configured to be transmitted from said receiver IED to the third set of receiver IEDs; and
  assigning the same VLAN-ID to all the messages sources of the communication cluster.

5. An Ethernet switch-based communication network of a Process Control (PC) system, comprising:
  a plurality of Intelligent Electronic Devices (IEDs) connected to switches of the Ethernet switch-based communication network, wherein the IEDs are configured to periodically send multicast messages, and wherein the switches are adapted to selectively forward a multicast message based on message-specific Virtual Local Area Network identifiers (VLAN-IDs) determined; and
  a processor configured for:
    retrieving, for each sender IED of the plurality of IEDs and for each message configured to be transmitted by each sender IED, from a system description of the PC system having logical data flow definitions, receiver IEDs for which the message is destined;
    identifying a first exhaustive set of receiver IEDs of a first message, and a second exhaustive set of receiver IEDs of a second message;
    assigning, when the first and second sets of receiver IEDs differ in at most the sender IEDs, a same VLAN-ID to both the first and second messages, and
    storing the assigned VLAN-ID in a system description of the PC system.

6. A configuration tool for configuring an Ethernet switch-based communication network of a Process Control (PC) system, comprising:
  a plurality of Intelligent Electronic Devices (IEDs) connected to switches of the Ethernet switch-based communication network, wherein the IEDs are configured to periodically send multicast messages, and wherein the switches are adapted to selectively forward a multicast message based on message-specific Virtual Local Area Network identifiers (VLAN-IDs); and
  a processor configured to:
    retrieve, for each sender IED of the plurality of IEDs and for each message configured to be transmitted by said sender IED, from a system description of the PC system, the receiver IEDs for which the message is destined, as well as the assigned VLAN ID; and
    assign, for each receiver IED, VLAN IDs of all the messages destined for this receiver IED to an edge port of a switch of the communication network to which this receiver IED is connected.

7. An Ethernet switch-based communication network according to claim 5, wherein the processor is configured to:
  employ the assigned VLAN-ID for multicast address filtering at a connection or port of a switch of the communication network to which a receiver IED of the first and second message is connected.

8. An Ethernet switch-based communication network according to claim 5, wherein the processor is configured to:
  identify a communication cluster having a number of message sources for each of which a message source control block configures a message to be transmitted by a sender IED of the cluster, wherein all messages sent by the sender IEDs of the cluster and related to a particular application of the PC system will be exclusively sent to some or all of the other sender IEDs of the cluster; and
  assign the same VLAN-ID to all the message sources of the communication cluster.

9. An Ethernet switch-based communication network according to claim 5, wherein the processor is configured to:

identify a communication cluster comprising a number of message sources for each of which a message source control block configures a message to be transmitted by a sender IED of the cluster, wherein each message source of the cluster is connected to all sender IEDs of the cluster via a cluster connection, wherein a connection from a message source to a receiver IED is a cluster connection if a first message configured to be transmitted from the message source to the receiver IED is also destined to a third set of receiver IEDs and if a second message, related to the same application as the first message, is configured to be transmitted from said receiver IED to the third set of receiver IEDs; and to assign the same VLAN-ID to all the messages sources of the communication cluster.

10. A configuration tool according to claim 6, wherein the processor is configured to: employ the assigned VLAN-ID for multicast address filtering at a connection or port of a switch of the communication network to which a receiver IED of the first and second message is connected.

11. A configuration tool according to claim 6, wherein the processor is configured to:

identify a communication cluster having a number of message sources for each of which a message source control block configures a message to be transmitted by a sender IED of the cluster, wherein all messages sent by the sender IEDs of the cluster and related to a particular application of the PC system will be exclusively sent to some or all of the other sender IEDs of the cluster; and assign the same VLAN-ID to all the message sources of the communication cluster.

12. A configuration tool according to claim 6, wherein the processor is configured to:

identify a communication cluster comprising a number of message sources for each of which a message source control block configures a message to be transmitted by a sender IED of the cluster, wherein each message source of the cluster is connected to all sender IEDs of the cluster via a cluster connection, wherein a connection from a message source to a receiver IED is a cluster connection if a first message configured to be transmitted from the message source to the receiver IED is also destined to a third set of receiver IEDs and if a second message, related to the same application as the first message, is configured to be transmitted from said receiver IED to the third set of receiver IEDs; and assign the same VLAN-ID to all the messages sources of the communication cluster.

\* \* \* \* \*